United States Patent
Kitamura (10) Patent No.: US 8,015,898 B2
(45) Date of Patent: Sep. 13, 2011

(54) AIR BREATHER STRUCTURE FOR AUTOMATIC TRANSMISSION

(75) Inventor: Masato Kitamura, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 1078 days.

(21) Appl. No.: 11/763,121

(22) Filed: Jun. 14, 2007

(65) Prior Publication Data

US 2008/0000319 A1    Jan. 3, 2008

(30) Foreign Application Priority Data

Jun. 15, 2006  (JP) ................. 2006-166125

(51) Int. Cl.
*F16H 57/02*   (2006.01)
*F16H 57/04*   (2010.01)
*F16H 61/00*   (2010.01)
*F01M 11/08*   (2006.01)

(52) U.S. Cl. .............. 74/606 R; 184/6.12; 184/6.23
(58) Field of Classification Search ........... 74/606 R, 74/467; 184/6.12, 6.23; *F16H 57/02*
See application file for complete search history.

(56) References Cited

U.S. PATENT DOCUMENTS

| | | | | |
|---|---|---|---|---|
| 4,911,035 | A * | 3/1990 | Taguchi | 74/606 R |
| 6,840,137 | B2 * | 1/2005 | Kaplan et al. | 74/606 R |
| 7,461,720 | B2 * | 12/2008 | Min | 184/6.12 |
| 2008/0041179 | A1 * | 2/2008 | Yasui et al. | 74/467 |
| 2009/0000874 | A1 * | 1/2009 | Okada et al. | 184/6.23 |
| 2011/0011204 | A1 * | 1/2011 | Ueno et al. | 74/606 R |

FOREIGN PATENT DOCUMENTS

| | | | |
|---|---|---|---|
| JP | 54-52537 | * | 4/1979 |
| JP | 58-99550 | * | 7/1983 |
| JP | 7-29352 | * | 6/1995 |
| JP | 10-103453 | | 4/1998 |
| JP | 11-37256 | * | 2/1999 |
| JP | 2006-300094 | * | 11/2006 |

OTHER PUBLICATIONS

JP 11-37256, Feb. 12, 1999, Machine translation.*
JP 7-29352, Jun. 2, 1995, Machine translation.*
JP 10-103453, Apr. 21, 1998, Machine translation.*

* cited by examiner

*Primary Examiner* — Vinh T. Luong
(74) *Attorney, Agent, or Firm* — Foley & Lardner LLP (57) ABSTRACT

An air breather structure for an automatic transmission. The structure includes a transmission case housing a power train accommodating a plurality of friction engagement devices, and an extension case housing a rotational member. The extension case and the transmission case are united with each other to constitute an automatic transmission housing. A breather chamber is located upside the automatic transmission housing in a state where the automatic transmission is mounted in a vehicle, and formed with an air vent for communication with outside air. An end wall is provided for partitioning the transmission case and the extension case therebetween to define a transmission case-side space and an extension case-side space. In this structure, the automatic transmission housing is formed with a transmission case-side communication passage through which the breather chamber communicates with the transmission case-side space, and an extension case-side communication passage through which the breather chamber communicates with the transmission case-side space.

10 Claims, 7 Drawing Sheets

AIR BREATHER STRUCTURE FOR AUTOMATIC TRANSMISSION

BACKGROUND OF THE INVENTION

This invention relates to improvements in an air breather structure for an automatic transmission, the structure allowing a space defined by a housing to communicate with outside air so as to counterbalance atmospheric pressure differentials between the interior and exterior of the housing.

In an automatic transmission housing, oil is held for lubricating, cooling, and hydraulically actuating a transmission mechanism of the automatic transmission. The automatic transmission housing is generally configured by uniting a transmission case (that houses the transmission mechanism) and an extension case (that houses a parking gear), and additionally is formed to have an air breather structure that allows a communication between a space in the housing and outside air. Atmospheric pressure differentials between the interior and exterior of the housing, attended with oil's comings and goings or temperature variations in the automatic transmission, are counterbalanced by virtue of the air breather structure through which air passes out of or into the housing.

Such an air breather structure is disclosed by the present inventor in Japanese Patent Provisional Publication No. 10-103453, in which a bulkhead part dividing the automatic transmission housing into transmission case-side and extension case-side spaces is formed with a through hole at its upper end section, the through hole establishing a communication between the transmission case-side and extension case-side spaces. The upper end section of the bulkhead part is formed further with a hollow open to the extension case-side space. The hollow is covered with a lid member, thereby constituting an oil drop separation chamber, i.e. a breather chamber.

The breather chamber is arranged to communicate with the outside of the transmission case through a vent defined at a relatively upper portion of the breather chamber, while arranged to communicate with the extension case-side space through two groove structures disposed vertically apart from each other.

With the through hole, internal pressures of the transmission case-side and extension case-side spaces are counterbalanced. Further, the breather structure has upper and lower groove structures as discussed above, and therefore, even if one groove structure is temporarily obstructed by oil such as at vehicle inclination, the other groove structure ensures the communication with the extension case-side space thereby counterbalancing the atmospheric pressure differentials between the interior and exterior of the automatic transmission housing.

SUMMARY OF THE INVENTION

However, drawbacks have been encountered in the above conventional air breather structures. Specifically, the extension case-side space is generally smaller than the transmission case-side space, so as to be apt to experience a significant oil level change in accordance with driving states. In spite of this, in the air breather chamber disclosed in Japanese Patent Provisional Publication No. 10-103453 the two groove structures are both provided only for communication between the breather chamber and the extension case-side space, which may bring about an event where the oil level in the extension case is inclined or varied such as by a driving state involving acceleration so that both groove structures are immersed in oil. In the event, when the oil flows into the breather chamber through the two groove structures and hardly goes out of the breather chamber into the extension case-side space, there rises a fear of a gush of oil. In order to avoid such an event it is required to design the breather chamber to have a larger capacity. However, it is difficult to enlarge the size of the breather chamber as far as the breathe chamber has the above-discussed air breather structure, which means possibilities for improvement.

It is, therefore, an object of the present invention to provide an improved air breather structure for an automatic transmission which structure can effectively overcome the drawbacks encountered in the above conventional techniques.

Another object of the present invention is to provide an improved air breather structure for the automatic transmission which structure can reliably prevent an internal pressure rise in the automatic transmission without a gush of oil even if the oil level in the automatic transmission housing is inclined or varied.

An aspect of the present invention resides in an air breather structure for an automatic transmission which structure comprises a transmission case and an extension case. The transmission case houses a power train including a plurality of friction engagement devices to achieve a plurality of gear ratios, while the extension case houses a rotational member rotatably attached to an output shaft of the power train. The extension case and the transmission case are united with each other to constitute an automatic transmission housing. A breather chamber is provided to be located upside the automatic transmission housing in a state where the automatic transmission is mounted in a vehicle, and formed with an air vent for communication with outside air. An end wall is provided for partitioning the transmission case and the extension case therebetween to define a transmission case-side space and an extension case-side space. In this structure, the automatic transmission housing is formed with a transmission case-side communication passage through which the breather chamber is allowed to communicate with the transmission case-side space, and an extension case-side communication passage through which the breather chamber is allowed to communicate with the transmission case-side space.

DETAILED DESCRIPTION OF THE INVENTION

Referring now to the accompanying drawings, an embodiment of an air breather structure for an automatic transmission, according to the present invention is illustrated. It is to be noted in this specification that words meaning "upper and lower sides of an automatic transmission housing, transmission case and extension case" are applied in a state where the automatic transmission housing is mounted in a vehicle.

Figure 1:
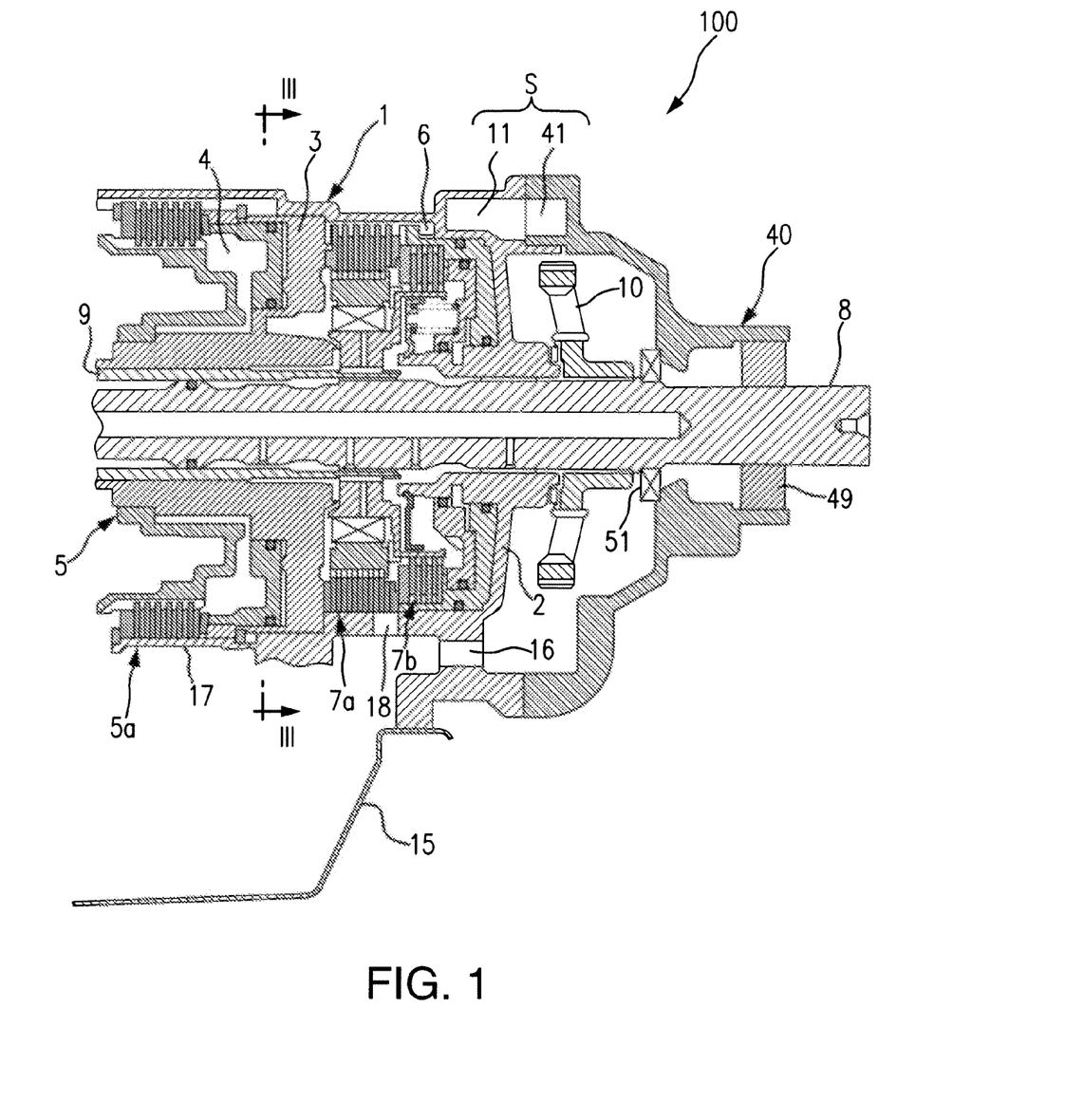
FIG. 1 is a longitudinal sectional view of the embodiment of an automatic transmission housing having an air breather structure according to the present invention, the automatic transmission housing being comprised of a transmission case and an extension case attached thereto.

FIG. 1 is a longitudinal sectional view of the embodiment of an automatic transmission housing having an air breather structure according to the present invention, showing around a connecting portion where a transmission case 1 and an extension case 40 connect with each other to constitute an automatic transmission housing 100.

The transmission case 1 in the automatic transmission housing 100 includes an end wall 2 and a bulkhead 3 provided spaced out from the end wall 2, thereby being divided to have first and second spaces. The first space is defined between the end wall 2 and the bulkhead 3, and meanwhile the second space is defined from the bulkhead 3 leftward in FIG. 1.

The transmission case 1 houses in the first space a friction engagement device 7 (7a, 7b) including a friction engagement element to constitute a brake. Therefore, the first space of the transmission case 1 serves as a brake chamber 6 (also referred to as a first chamber).

The transmission case 1 houses in the second space the residual part of the power train, i.e. a transmission mechanism 5 including a planetary gear train not shown and the other friction engagement device (5a) than the friction engagement device 7. Therefore, the second space of the transmission case 1 serves as a transmission mechanism chamber 4 (also referred to as a second chamber).

The end wall 2 of the transmission case 1 is pierced by an output shaft 8 extending from the transmission mechanism 5. The output shaft 8 coaxially pierces through a sleeve-shaped rotational shaft 9 in such a manner as to be disposed on an inner diameter side of the sleeve. The rotational shaft 9 is supported by the bulkhead 3 and extends from the side of the transmission mechanism chamber 4 to the inside of the brake chamber 6.

In the extension case 40 attached at its forward end to the end wall 2 of the transmission case 1, a parking gear 10 installed to the output shaft 8 is disposed.

The output shaft 8 pierces through a rear end portion of the extension case 40 in a manner to be oil tight with a seal ring 49, and further extends outside of the automatic transmission housing 100.

Additionally, a thrust bearing 51 is disposed between the output shaft 8 and the extension case 40 to receive a thrust load.

The transmission case 1 includes a first half portion 11 outside the brake chamber 6. The first half portion 11 is formed depressingly to constitute one side part of a breather chamber S. The first half portion 11 has closed ends in the circumferential direction, though not shown in FIG. 1 but shown in FIG. 2.

The end wall 2 of the transmission case 1 has at its lower portion an oil hole 16 through which the extension case 40 communicates with a space defined by an oil pan 15 disposed below the transmission case 1. With this, oil is allowed to flow freely between the extension case 40 and the oil pan 15.

The transmission case 1 has at its lower portion further oil holes 17 and 18 each of which is formed in such a manner as to cut out a part of a splined wall. Therefore, the transmission mechanism chamber 4 and the brake chamber 6 are adapted to communicate with the space defined by the oil pan 15 through the oil holes 17 and 18, respectively.

Figure 2:
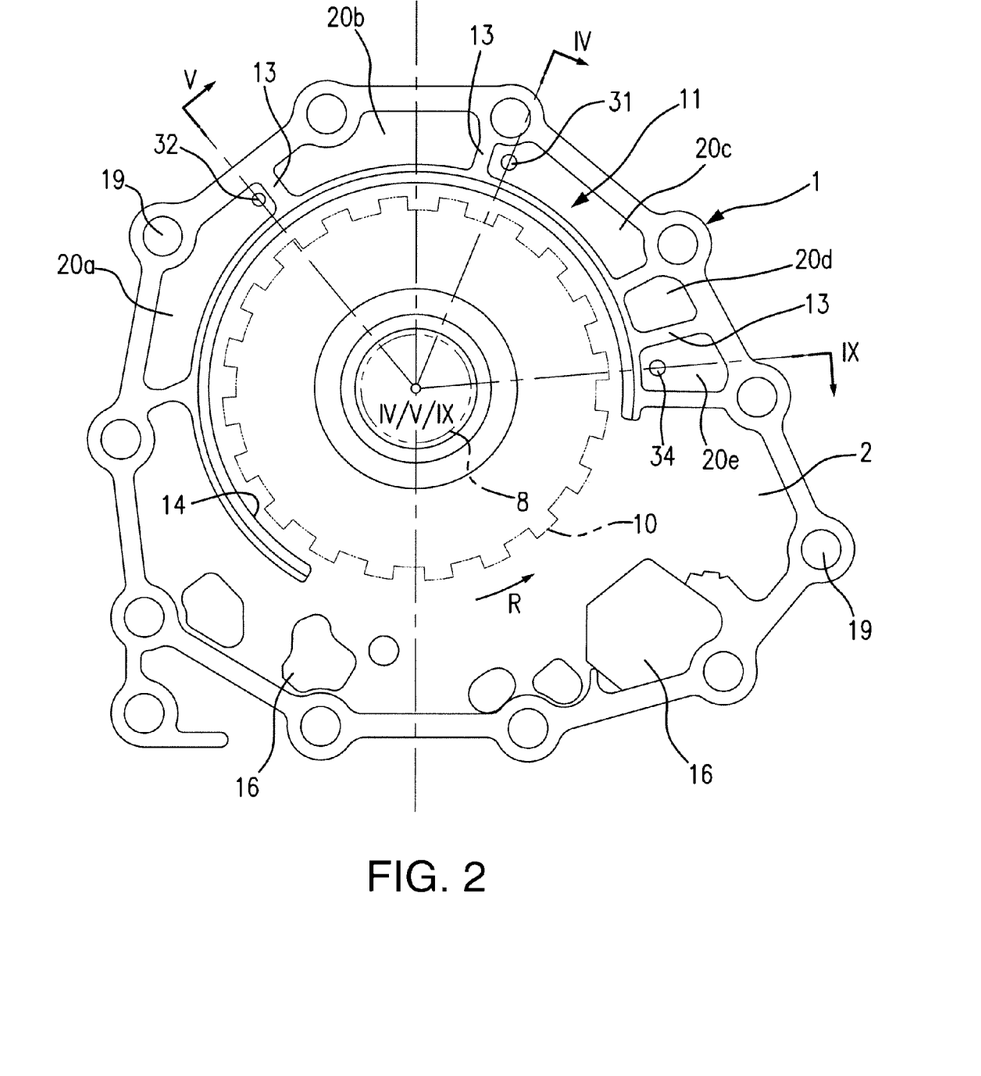
FIG. 2 shows the transmission case illustrated in FIG. 1, as viewed from the side of the extension case.

FIG. 2 shows the transmission case 1 illustrated in FIG. 1, as viewed from the side of the extension case 40.

Figure 5:
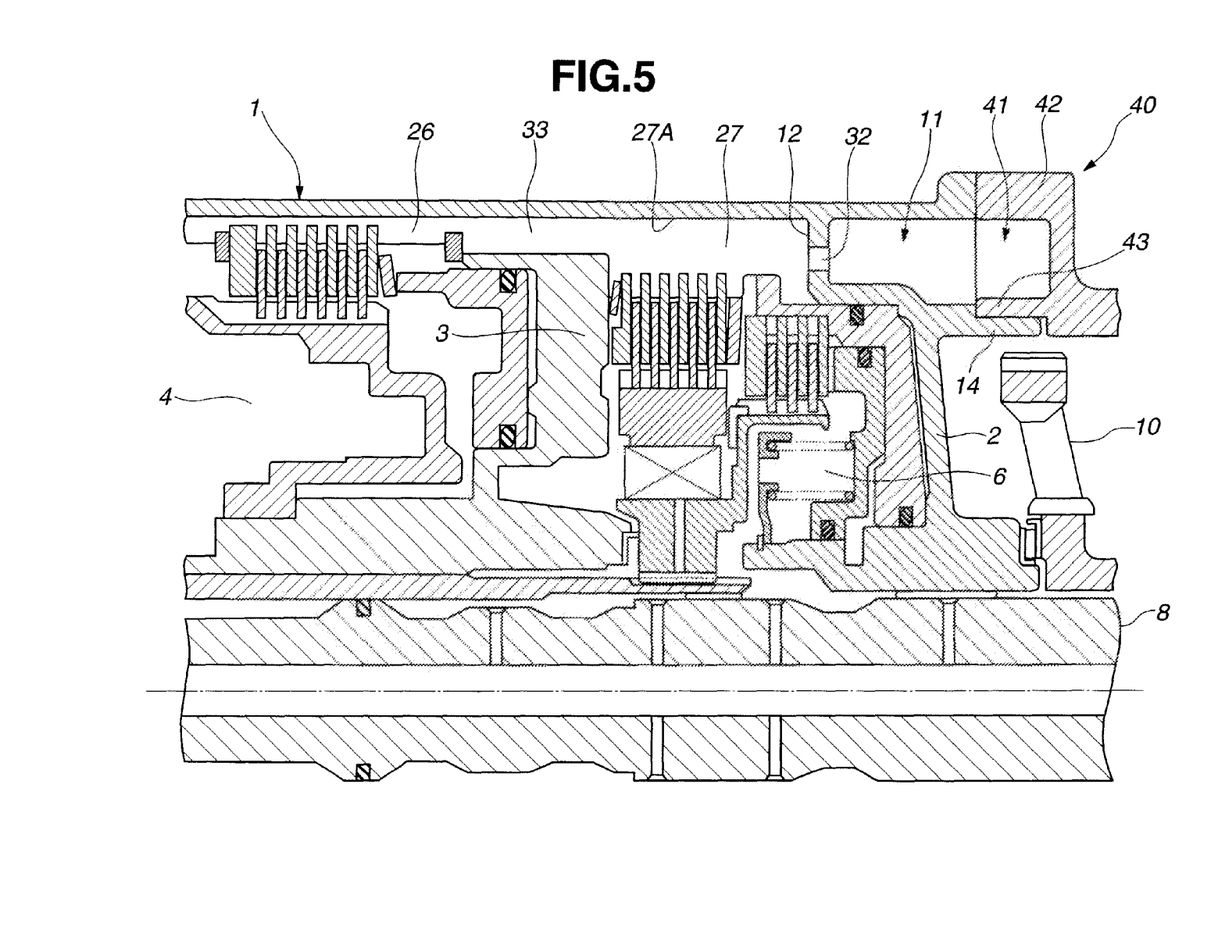
FIG. 5 is an enlarged sectional view similar to FIG. 4, but taken generally along the plane indicated by lines V-V in FIG. 2.

The first half portion 11 of the transmission case 1 extends generally from the height of the output shaft 8 in a state where the automatic transmission is mounted in a vehicle, over the upper half of the transmission case 1, thereby being formed arcuately when viewed from an axial direction of the output shaft 8. Additionally, the depressingly shaped first half portion 11 is formed to have therein a plurality of partitions 13 in a circumferential direction, thereby being divided into a plurality of impressions 20a to 20e. Additionally, as shown in FIG. 5, each of the partitions 13 is formed extending in the axial direction from a bottom wall 12 to an opening of the first half portion 11.

The end wall 2 of the transmission case 1 is provided with a baffle 14 which is shaped arcuate along a periphery of the output shaft 8 so as to surround the parking gear 10. Though not shown in FIG. 2 but shown in FIG. 4, the baffle 14 is provided extending in the axial direction of the output shaft 8, thereby slightly entering a space defined by the extension case 40.

When viewed from the axial direction, one end that the baffle 14 has in its circumferential direction is located generally corresponding to one of the closed ends of the first half portion 11, on a leading side that teeth 10a of the parking gear 10 approach by rotation thereof during vehicle's forward movement. Meanwhile, the other end of the baffle 14 is located lower than the other of the closed ends of the first half portion 11, on a trailing side from which the teeth 10a of the parking gear 10 moves away.

An arrow R as shown in FIG. 2 indicates a rotational direction of the parking gear 10 during vehicle's forward movement. Accordingly, the right and left ends of the first half portion 11 correspond to the leading and trailing sides, respectively.

It will be understood that "the leading side" and "the trailing side" discussed in this specification are defined with respect to the rotational direction of the parking gear 10.

Holes illustrated by reference numerals 19 in FIG. 2 are bolt holes for joining the extension case 40 to the transmission case 1.

Figure 3:
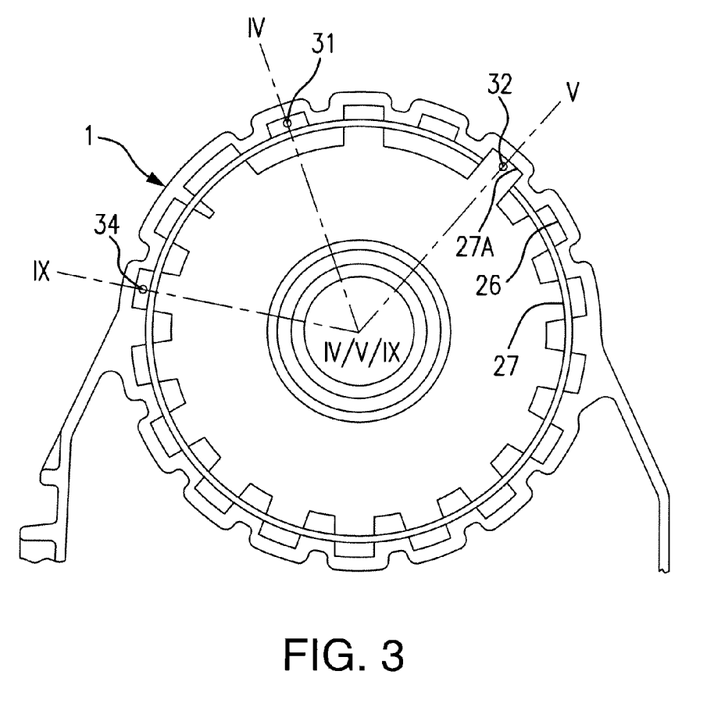
FIG. 3 is an enlarged sectional view of the transmission case, taken generally along the plane indicated by lines III-III in FIG. 1.
Figure 4:
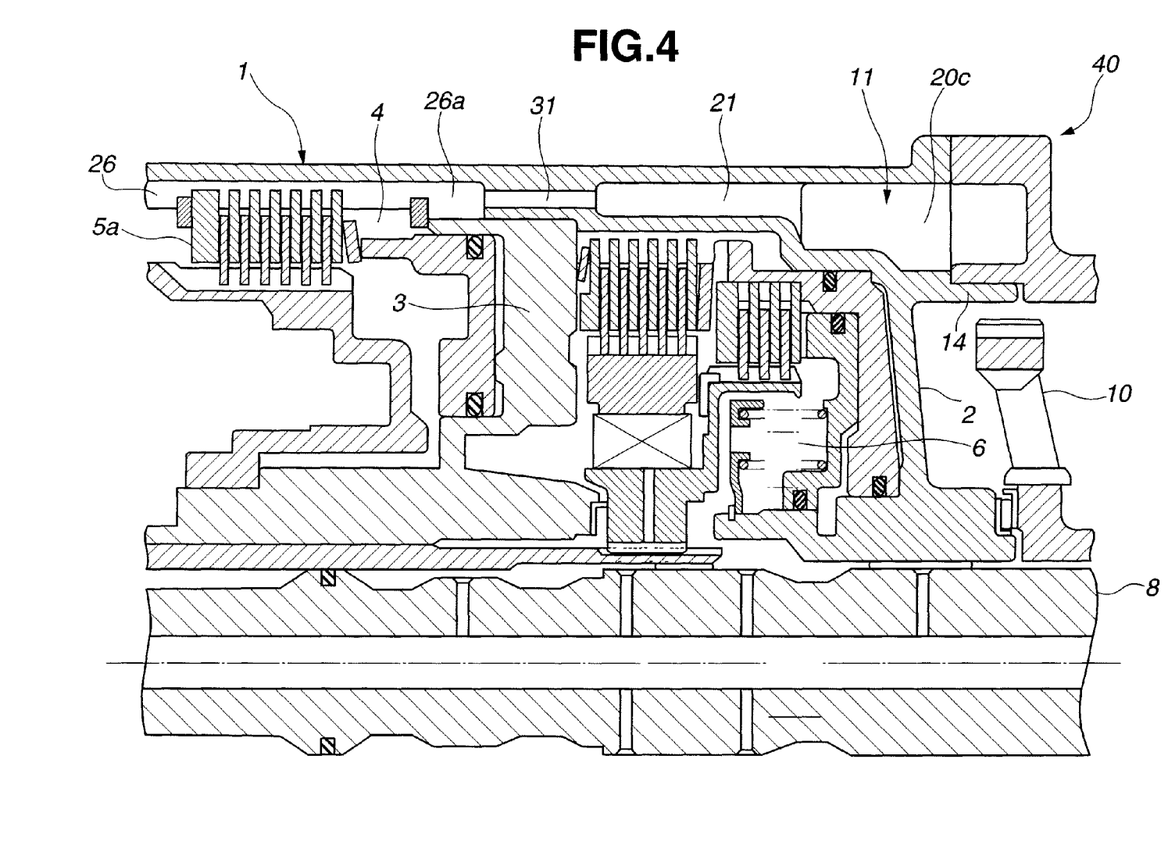
FIG. 4 is an enlarged sectional view of the transmission case, taken generally along the plane indicated by lines IV-IV in FIG. 2.

FIG. 3 is a sectional view of the transmission case 1, taken generally along the plane indicated by lines III-III in FIG. 1. Additionally, FIG. 4 is a sectional view of the transmission case 1, taken generally along the plane indicated by lines B-O in FIG. 2. Lines for making some reference sectional views, indicated in FIG. 2 by IV-IV, V-V, and IX-IX, are indicated also in FIG. 3 by the same character.

FIG. 4 illustrates the transmission case 1 including an extending portion 21 at a relatively upper portion of the first half portion 11. The extending portion 21 is formed outside the brake chamber 6 and additionally extends in the axial direction of the output shaft 8 from the impression 20c to an installation section where the bulkhead 3 is installed to the transmission case 1. The transmission case 1 has an outer peripheral wall that continues to the installation section of the transmission case 1, and additionally has transmission mechanism chamber-side splines 26 (also referred to as second chamber-side splines) for supporting a friction disc of the friction engagement device 5*a,* at the inner surface of the outer peripheral wall. The transmission mechanism chamber-side splines 26 define a valley portion between adjacent splines. Further, the transmission case 1 includes a first communication passage 31 at the installation section (where the bulkhead 3 is installed to the transmission case 1) so as to allow the extending portion 21 of the first half portion 11 to communicate with the valley space of transmission mechanism chamber-side splines 26.

Same as the above arrangement, the impression 20*e* (the endmost impression in the leading side) defined between the adjacent partitions 13 is adapted to communicate with the valley space defined between the adjacent transmission mechanism chamber-side splines 26, through a fourth communication passage 34 formed at the lowest possible position of the first half portion 11, though not shown. This arrangement is applied in a section indicated by IX-IX in FIGS. 2 and 3.

FIG. 5 is an enlarged sectional view similar to FIG. 4, but taken generally along the plane indicated by lines V-V in FIG. 2.

An outer peripheral wall around the brake chamber 6 has at its inner surface brake chamber-side splines 27 (also referred to as first chamber-side splines) for supporting a friction disc. As particularly shown in FIG. 3, the brake chamber-side splines 27 are formed to have a major diameter smaller than that the transmission mechanism chamber-side splines 26 have. However, the brake chamber-side splines 27 have a major diameter corresponding to that of the transmission mechanism-side splines 26, only at a spline valley 27A located at a relatively upper position of the brake chamber-side splines 27. In other words, the spline valley 27A extends in the axial direction to communicate with the brake chamber 6 through the valley space of the transmission mechanism-side splines 26.

Similar to the above-mentioned arrangement where the impression 20*c* includes the extending portion 21, the impression 20*a* defined at a relatively upper portion of the first half portion 11 is formed having a second communication passage 32 at the bottom wall 12, so as to communicate with the spline valley 27A whose major diameter is extended to correspond to that of the transmission mechanism-side splines 26, as discussed above.

A portion where the valley space of the brake chamber-side splines 26 passes through the installation section (where the bulkhead 3 is installed to the transmission case 1) and communicates with the major diameter-extended spline valley 27A of the transmission mechanism chamber-side splines 27 serves as a third communication passage 33 which allows a communication between the transmission mechanism chamber 4 and the brake chamber 6.

Figure 6:
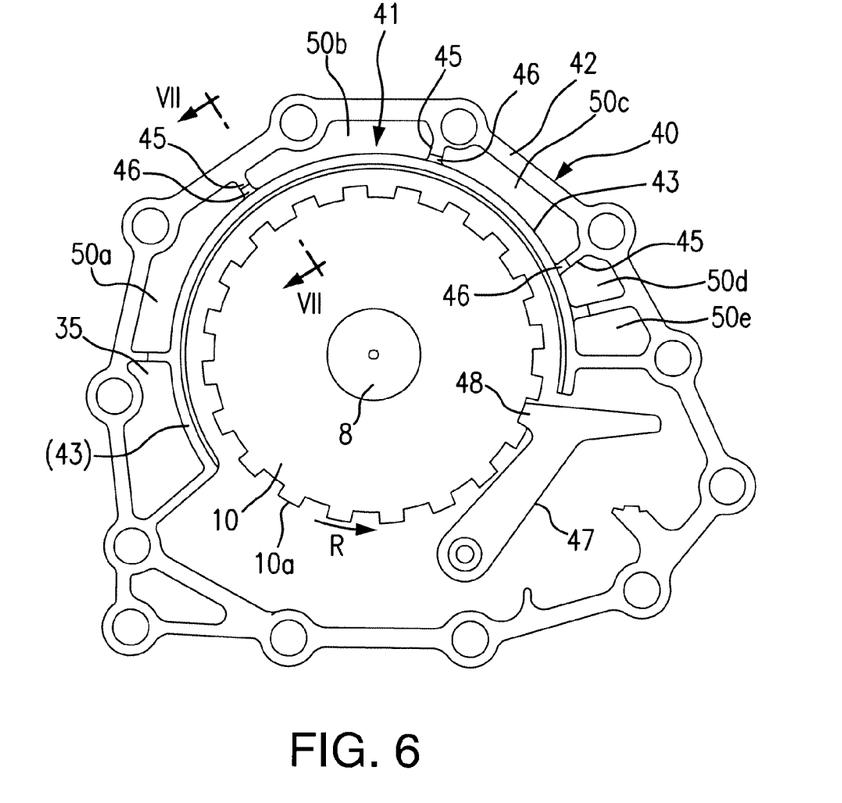
FIG. 6 shows the extension case illustrated in FIG. 1, as viewed from the side of the transmission case.

FIG. 6 shows the extension case illustrated in FIG. 1, as viewed from the side of the transmission case and laterally inverted for ready understanding.

The extension case 40 is formed including a second half portion 41 that opens at a contact face where the extension case 40 is in contact with the transmission case 1. The second half portion 41 of the extension case 40 has on radial sides an outer peripheral wall 42 and an inner wall 43 be formed depressingly, and additionally has a circumferential length meeting that of the first half portion 11 of the transmission case 1.

Figure 7:
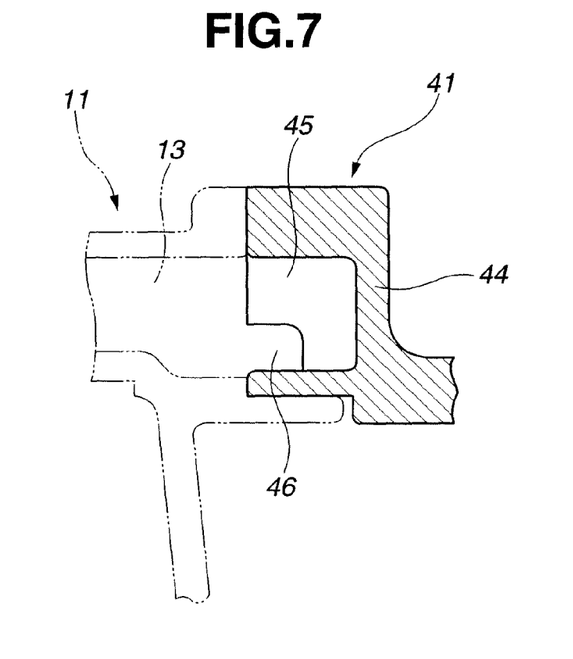
FIG. 7 is a fragmentary sectional view of the extension case and the transmission case imaginarily attached thereto, taken generally along the plane indicated by lines VII-VII in FIG. 6.

The second half portion 41 is formed with partitions 45 in its circumferential direction, the partitions 45 corresponding to the partitions 13 of the first half portion 11 of the transmission case 1. With this, the second half portion 41 is divided into a plurality of impressions 50*a* to 50*e*. Additionally, as shown in FIG. 7, each of the partitions 45 is formed extending in the axial direction from a bottom wall 44 of the second half portion 41 to an opening of the second half portion 41.

The outer peripheral wall 42 of the second half portion 41 is to meet the outer peripheral wall (non numeral) of the transmission case 1 while the inner wall 43 is to be guided by the baffle 14, so that each end face of the outer peripheral wall 42 and the inner wall 43 is to be brought into contact with an end face of the transmission case 1 when the extension case 40 is installed to the transmission case 1. With this, the first and second half portions 11 and 41 define a breather chamber S.

Further, the partitions 13 and 45 of the first and second half portions 11 and 41, respectively, correspond and face to each other, so that the breather chamber S is divided into a plurality of cells.

The second half portion 41 of the extension case 40 includes a closed end on the leading side (that the teeth 10*a* of the parking gear 10 approach by its rotation during vehicle's forward movement). The opposite end, i.e. an end that the second half portion 41 has on the trailing side (from which the teeth 10*a* of the parking gear 10 moves away), is formed including a fifth communication passage 35, thereby serving as an opened end.

The inner wall 43 arcuately surrounding the parking gear 10 extends in the circumferential direction downward from the opened end of the second half portion 41 to a certain extent, at the trailing side.

The baffle 14 of the transmission case 1 formed to locate inside the inner wall 43 of the extension case 40 (or nearer than the inner wall 43 to the parking gear 10) extends in the circumferential direction downward further than the inner wall 43, at the trailing side from which the teeth 10*a* of the parking gear 10 moves away. With this arrangement, oil splashed by the parking gear 10 is made difficult to enter into the opened end of the second half portion 41.

A member illustrated by reference numeral 47 in FIG. 6 is a parking lock lever connected to a shift lever (not shown). The parking lock lever has a lug 48, so as to be engageable with the teeth 10*a* of the parking gear 10 by operation of the shift lever.

FIG. 7 is a sectional view of the extension case 40, taken generally along the plane indicated by lines VII-VII in FIG. 6. As shown in FIG. 7, each of the partitions 45 of the second half portion 41 of the extension case 40 is partially cut away at its end face opposed to each of the partitions 13 of the first half portion 11 of the transmission case 1, thereby defining an aperture 46. With this, a communication among the cells of the breather chamber S is allowed. Further, the second half portion 41 has the fifth communication passage 35 on the trailing side as discussed above, thereby allowing a communication between the breather chamber S and the space defined by the extension case 40.

Figure 8:
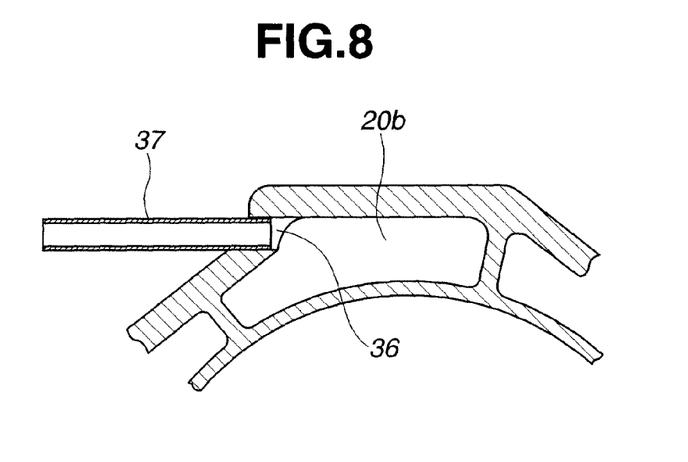
FIG. 8 is a fragmentary sectional view of the transmission case illustrated in FIG. 1, taken generally along the plane perpendicular to an axial direction of an output shaft, showing an air vent and a breather pipe that a breather chamber of the transmission case has.

FIG. 8 is a fragmentary sectional view of the breather chamber S, showing that an uppermost cell of the breather chamber S has an air vent 36 and provided with a breather pipe 37. An outer wall defining the impression 20*b* located at the uppermost of the breather chamber S is formed with the air vent 36 that communicates with the outside of the automatic transmission housing 100. Additionally, the breather pipe 37 is provided to fit in the air vent 36. Thus, the breather chamber S is allowed to communicate with outside air through the air vent 36 and the breather pipe 37.

In the above embodiment, the transmission mechanism chamber 4 and the brake chamber 6 correspond to first and second chambers, respectively.

Additionally, the fifth communication passage 35 corresponds to an extension case-side communication passage.

As has been discussed above, the breather chamber S is formed at an upper half portion of the automatic transmission housing 100 that consists of the transmission case 1 and the extension case 40 attached thereto. The breather chamber S has the first communication passage 31 at its relatively upper section or generally at its center in the circumferential direction (i.e. such a direction as to surround the parking gear 10) thereby communicating with a space defined by the transmission mechanism chamber 4, and additionally has the fourth communication passage 34 at its relatively lower section located on the leading side in the circumferential direction thereby communicating with the space defined by the transmission mechanism chamber 4. Further, the breather chamber S has the fifth communication passage 31 serving as the opened end on the trailing side, thereby communicating with the space defined by the extension case 40.

Furthermore, the breather chamber S is also adapted to communicate with outside air through the breather pipe 37.

Additionally, the transmission mechanism chamber 4 and the brake chamber 6 are allowed to communicate with each other through the third communication passage 33 defined by the valley space of the transmission mechanism chamber-side splines 26 and by the spline valley 27A of the brake chamber-side splines 27.

Technical ideas grasped from the above embodiment will be discussed together with effects obtained therein.

(a) An air breather structure for an automatic transmission comprises a transmission case and an extension case. The transmission case houses a power train including a plurality of friction engagement devices to achieve a plurality of gear ratios, while the extension case houses a rotational member rotatably attached to an output shaft of the power train. The extension case and the transmission case are united with each other to constitute an automatic transmission housing. A breather chamber is provided to be located upside the automatic transmission housing in a state where the automatic transmission is mounted in a vehicle, and additionally is formed with an air vent for communication with outside air. An end wall is provided for partitioning the transmission case and the extension case therebetween to define a transmission case-side space and an extension case-side space. In this structure, the automatic transmission housing is formed with a transmission case-side communication passage through which the breather chamber is allowed to communicate with the transmission case-side space, and an extension case-side communication passage through which the breather chamber is allowed to communicate with the transmission case-side space.

According to the idea (a), air held in the automatic transmission housing is allowed to readily flow from the transmission case that houses the power train so as to be apt to increase in internal pressure due to a temperature rise, into the extension case having a low internal pressure, through the breather chamber. A pressure rise in the transmission case is, therefore, rapidly suppressed.

Oil may obstruct one of the transmission case-side and extension case-side communication passages, such as when babbles occur due to the temperature rise, when the attitude of vehicle is changed, or when a driving state is attended with acceleration; however, an event where both of the communication passages are simultaneously obstructed by oil is difficult to occur. This prevents oil that flows into the breather chamber from gushing out with escape cut off.

(b) In the air breather structure as discussed in the idea (a), the transmission case has at its surface facing to the extension case a first half portion formed open to the extension case, while the extension case has at its surface facing to the transmission case a second half portion formed open to the transmission case. Additionally, the breather chamber is formed by uniting the first half portion of the transmission case and the second half portion of the extension case.

According to the idea (b), the breather chamber is readily formed by uniting the transmission case and the extension case. Further, the first and second half portions are formed integral with the transmission case and the extension case, respectively, and therefore do not require any lid member or partition among the cases and the breather chamber while the number of changeovers for installation is reduced.

(c) In the air breather structure as discussed in the idea (a), the transmission case is divided in an axial direction by a bulkhead into first and second chambers. Additionally, the transmission case-side communication passage includes a first communication passage through which the breather chamber is allowed to communicate with the first chamber of the transmission case, and a second communication passage through which the breather chamber is allowed to communicate with the second chamber of the transmission case.

According to the idea (c), even if internal pressure is increased in one (or both) of the first and second chambers, the internal pressure can escape to the other having a lower internal pressure, through the breather chamber directly.

(d) In the air breather structure as discussed in the idea (c), the first and second communication passages are defined to be located upper than the extension case-side communication passage.

According to the idea (d), even if oil flows into the breather chamber through either of the first and second communication passages due to a certain driving state, the oil is to be discharged into the extension case through the extension case-side communication passage so as not to gush out through the air vent of the breather chamber. Additionally, even in a case where oil flows into the breather chamber through the extension case-side communication passage due to a certain driving state, the oil is to be discharged through the extension case-side communication passage again under its own weight so as to be hard to accumulate in the breather chamber and to gush out.

(e) In the air breather structure as discussed in the idea (c), the transmission case is formed further with a third communication passage through which the first and second chambers of the transmission case are allowed to communicate with each other.

According to the idea (e), the first and second chambers are adapted communicate with each other through the breather chamber indirectly, and through the third communication passage directly. With this arrangement, even when the internal pressure suddenly rises in either of the first and second chambers, the internal pressure can escape to the other chamber immediately. Therefore, the internal pressure in each chamber can be brought into balance immediately.

(f) In the air breather structure as discussed in the idea (a), the breather chamber is formed along a circumferential direction of a periphery of the rotational member, and located upper than the output shaft. Additionally, the extension case-side communication passage is defined at an end section of the breather chamber, the end section being located at a trailing side of the rotational member.

According to the idea (f), oil stirred and splashed by teeth of the rotational member (or a parking gear) is made difficult to enter the breather chamber through the extension case-side communication passage.

(g) In the air breather structure as discussed in the idea (f), the breather chamber is provided with a baffle extending at the trailing side more downward than the end section of the breather chamber.

According to the idea (g), the baffle is extended to have an end located lower than the trailing-side end of the breather chamber, so that the extension case-side communication passage is more reliably protected against the splashed oil.

(h) In the air breather structure as discussed in the idea (c), the first and second communication passages are located opposite to each other with respect to a vertical plane passing through the output shaft and extending in an axial direction of the output shaft.

According to the idea (h), the first and second communication passages are difficult to interfere with each other with such a location. Further, each of the first and second communication passages is defined at a relatively upper portion of the breather chamber, so as to be hardly immersed in oil whose level is varied in accordance with driving states.

(i) In the air breather structure as discussed in the idea (h), the transmission case-side communication passage further includes a fourth communication passage through which the breather chamber is allowed to communicate with one of the first and second chambers of the transmission case. The fourth communication passage is located opposite to the extension case-side communication passage with respect to the vertical plane passing through the output shaft, and is located lower than the first and second communication passages.

According to the idea (i), when oil flows through the first communication passage into the breather chamber, the oil is discharged through one of the fourth and fifth communication passages which one located on the same side as the first communication passage with respect to the above-mentioned vertical plane. When oil flows through the second communication passage into the breather chamber, the oil is discharged through one of the fourth and fifth communication passages which one located on the same side as the second communication passage with respect to the above-mentioned vertical plane. Specifically, oil-dischargeable communication passages are formed below each of the first and second communication passages, so that oil is efficiently discharged. It will be understood that oil that flows through the fourth communication passage into the breather chamber is to be discharged through the fourth communication passage into the first chamber under its own weight, same as oil that flows through the fifth communication passage into the breather chamber.

(j) In the air breather structure as discussed in the idea (i), the second chamber of the transmission case houses the friction engagement devices adapted to rotate at high speed during a certain gear ratio. Additionally, the fourth communication passage is defined to communicate with the first chamber of the transmission case.

According to the idea (j), the fourth communication passage communicates with the first chamber, and not the second chamber in which oil is to be vigorously stirred as compared with in the first chamber. In other words, the fourth communication passage is to return oil accumulated in the breather chamber to the first chamber and not the second chamber. This prevents such a situation as splashed oil enters the breather chamber through the fourth communication passage. Additionally, an opening of the fourth communication passage which opening is defined on a first chamber-side is difficult to be obstructed by oil even when the automatic transmission itself is inclined during grade climbing, since the oil level of the first chamber drops below that of the second chamber.

(k) In the air breather structure as discussed in the idea (a), the first and second chambers of the transmission case are formed having first chamber-side splines and second chamber-side splines at its outer peripheral wall, respectively, to support a friction disc of the friction engagement devices housed in the first and second chambers. Each of the first chamber-side splines and the second chamber-side splines defines a valley space between adjacent splines. The transmission case-side communication passage is formed open to the valley space that each of the first chamber-side splines and the second chamber-side splines has.

According to the idea (k), such a simple path makes it possible to achieve a communication among the first and second chambers and the breather chamber, and to prevent the automatic transmission housing from a significant increase in outer diameter.

Although the invention has been described above by reference to certain embodiments and examples of the invention, the invention is not limited to the embodiments and examples described above. Modifications and variations of the embodiments and examples described above will occur to those skilled in the art, in light of the above teachings.

For example, the breather chamber S as has been discussed in the above embodiment is comprised of the first and second half portions 11 and 41, and formed arcuately about the output shaft 8 to be located upside the automatic transmission housing 100 from the height of the output shaft 8 in a state where the automatic transmission is mounted in the vehicle. However, it will be understood that a location of each end of the arcuate chamber is not limited to the height of the output shaft 8 and is set suitably according to space.

Additionally, the aperture 46 discussed in the embodiment is formed in such a manner as to cut away a part of each of the partitions 45 of the second half portion 41 of the extension case 40, so as to allow a communication among the cells of the breather chamber S, the cells being defined by the partitions 13, 45 dividing the breather chamber S. However, the aperture 46 may be formed in the partitions 13 of the first half portion 11 of the transmission case 1.

Further, the end wall 2 formed integral with the transmission case 1 in the above embodiment may be a lid member separate from the transmission case 1, according to design conditions. Meanwhile, the bulkhead 3 is not limited to such a separate member as to be installed to the transmission case 1, and therefore may be formed integral with the transmission case 1.

In the above embodiment the fourth communication passage 34 of the impression 20e that the breather chamber S has at the leading side is adapted to communicate with the valley space defined between the adjacent transmission mechanism chamber-side splines 26, same as the first communication passage 31 located at a relatively upper portion of the breather chamber. However, as a modification, the fourth communication passage 34 may be adapted to communicate with the brake chamber 6, and besides may communicate with both the transmission mechanism chamber 4 and the brake chamber 6, same as the third communication passage 33 shown in FIG. 5 (a sectional view of the transmission case 1, taken generally along the plane indicated by lines D-O in FIG. 2).

The entire contents of Japanese Patent Application P2006-166125 (filed Jun. 15, 2006) are incorporated herein by reference. The scope of the invention is defined with reference to the following claims.

What is claimed is:

1. An air breather structure for an automatic transmission, comprising:

a transmission case that houses a power train including a plurality of friction engagement devices to achieve a plurality of gear ratios;

an extension case that houses a rotational member rotatably attached to an output shaft of the power train, the extension case and the transmission case being united with each other to constitute an automatic transmission housing;

a breather chamber formed at the top of the automatic transmission housing, the breather chamber being formed with an air vent for communication with outside air; and an end wall partitioning the transmission case and the extension case therebetween to define a transmission case-side space and an extension case-side space, wherein the automatic transmission housing is formed with transmission case-side communication passages through which the breather chamber is allowed to communicate with the transmission case-side space, and an extension case-side communication passage through which the breather chamber is allowed to communicate with the extension case-side space, wherein the transmission case is divided in an axial direction by a bulkhead into first and second chambers, and wherein the transmission case-side communication passage includes a first communication passage through which the breather chamber is allowed to communicate with the first chamber, and a second communication passage through which the breather chamber is allowed to communicate with the second chamber.

2. An air breather structure as claimed in claim 1, wherein the transmission case has at its surface facing to the extension case a first half portion formed open to the extension case, wherein the extension case has at its surface facing to the transmission case a second half portion formed open to the transmission case, wherein the breather chamber is formed by uniting the first half portion of the transmission case and the second half portion of the extension case.

3. An air breather structure as claimed in claim 1, wherein the first and second communication passages are defined to be located upper than the extension case-side communication passage.

4. An air breather structure as claimed in claim 1, wherein the transmission case is formed further with a third communication passage through which the first and second chambers of the transmission case are allowed to communicate with each other.

5. An air breather structure as claimed in claim 1, wherein the breather chamber is formed along a circumferential direction of the rotational member, and located upper than the output shaft, wherein the extension case-side communication passage is defined at an end section of the breather chamber, the end section being located at a trailing side of the rotational member.

6. An air breather structure as claimed in claim 5, wherein the breather chamber is provided with a baffle extending at the trailing side more downward than the end section of the breather chamber.

7. An air breather structure as claimed in claim 1, wherein the first and second communication passages are located opposite to each other with respect to a vertical plane passing through the output shaft and extending in an axial direction of the output shaft.

8. An air breather structure as claimed in claim 7, wherein the transmission case-side communication passage further includes a fourth communication passage through which the breather chamber is allowed to communicate with one of the first and second chambers of the transmission case, the fourth communication passage being located opposite to the extension case-side communication passage with respect to the vertical plane passing through the output shaft, the fourth communication passage being located lower than the first and second communication passages.

9. An air breather structure as claimed in claim 8, wherein the second chamber of the transmission case houses the friction engagement devices adapted to rotate at high speed during a certain gear ratio, wherein the fourth communication passage is defined to communicate with the first chamber of the transmission case.

10. An air breather structure as claimed in claim 1, wherein the first and second chambers of the transmission case are formed having first chamber-side splines and second chamber-side splines at its outer peripheral wall, respectively, to support a friction disc of the friction engagement devices housed in the first and second chambers, each of the first chamber-side splines and the second chamber-side splines defining a valley space between adjacent splines, wherein the transmission case-side communication passage is formed open to the valley space that each of the first chamber-side splines and the second chamber-side splines has.

* * * * *